United States Patent [19]

Miwa et al.

[11] Patent Number: 5,140,773
[45] Date of Patent: Aug. 25, 1992

[54] ULTRASONIC MACHINE AND ITS MACHINING METHOD

[75] Inventors: Yuji Miwa, Chita; Hideki Takabayashi, Nagoya, both of Japan

[73] Assignee: Brother Kogyo Kabushiki Kaisha, Nagoya, Japan

[21] Appl. No.: 651,019

[22] Filed: Feb. 5, 1991

[30] Foreign Application Priority Data

Feb. 14, 1990 [JP] Japan .................................. 2-33364
Mar. 2, 1990 [JP] Japan .................................. 2-52507

[51] Int. Cl.⁵ .......................................... B24B 49/04
[52] U.S. Cl. ............................... 51/59 SS; 51/165 R; 51/165.93; 51/281 P
[58] Field of Search ............... 51/35, 33 R, 595 S, 51/165 R, 165.77, 165.93, 281 P, 290, DIG. 11, 55, 58, 119, 90, 120; 439/13

[56] References Cited

U.S. PATENT DOCUMENTS 3,699,719 10/1972 Rozdilsky et al. ............... 51/59 SS
4,512,116 4/1985 Vanderwal ........................ 51/331

FOREIGN PATENT DOCUMENTS 64-56941 4/1989 Japan .

Primary Examiner—Bruce M. Kisliuk
Assistant Examiner—E. Morgan
Attorney, Agent, or Firm—Oliff & Berridge

[57] ABSTRACT

This invention is directed to an ultrasonic machine and its method of operation. The machine has a main shaft rotatably supported in a housing, a machining head attached to one end of the main shaft, a piezoelectric transducer provided on the machining head, and a tool attached to an end of the machining head. The machine also includes slip rings provided on the periphery of either the machining head or the main shaft as an input terminal, brushes being in slidable touch with the slip rings and connected to a power source, and a brush detach apparatus for detaching the brushes from the slip rings to reduce friction and disconnect ultrasonic operation. The tool is rotated and pressed onto the work, hence starting a boring operation. After the rotation forms a pre-determined depth of a bore, the tool is ultrasonically vibrated to bore further into the work. The method and apparatus are particularly suited to boring small holes in ceramics and the like.

13 Claims, 7 Drawing Sheets

ULTRASONIC MACHINE AND ITS MACHINING METHOD

BACKGROUND OF THE INVENTION

The present invention relates to a machine tool. More particularly, the present invention relates to an ultrasonic machine that has, on one end of a main shaft, a machine head provided with a piezoelectric transducer for exciting a tool attached to the machine head in ultrasonic vibrations. The present invention also relates to a machining method in which a tool head with grindstone on the tip thereof is rotated and ultrasonically vibrated at the same time to machine the work.

Conventionally, machine tools that have, on a main shaft, a machining head provided with a piezoelectric transducer are used to ultrasonically machine hard materials such as ceramics and glass. Japan Published Unexamined Utility Model Application No. 64-56941 discloses one such machine tool comprising a machine head which is provided with a piezoelectric transducer and a housing thereof. The housing is mounted on the machining head via a large-diameter bearing that encircles the machining head. Slip rings are provided on the periphery of the machining head in order to connect the piezoelectric transducer of the rotatable machining head to a power source. On the other hand, brushes are provided on the inner surface of the housing that are in slidable contact with the slip rings. The brushes are connected with the power source via cables.

However, in such a conventional machine tool, a machining method suitable for the tool on the work sometimes cannot be adopted because of the difficulty of rotating the machining head at a high speed. This is because the large-diameter bearing provided between the machining head and the housing is vulnerable to high speed rotation. The vulnerability cannot be overcome by providing the large-diameter bearing with various lubricating means as is the case with the main shaft because the machining head is small in size. Furthermore, the brushes being in touch with the slip rings at all times also hampers high-speed rotation. If the tool is no more than 1 mm in diameter, the slow rotation does not allow the periphery of the tool to travel fast enough. This causes various problems including a low machining efficiency and a short life of a tool.

A known method of ultrasonically machining hard, brittle materials such as ceramic and glass uses an ultrasonic machine equipped with a grindstone such as diamond for boring or polishing. More particularly, the main shaft is rotated by a motor while the piezoelectric transducer is ultrasonically vibrated at the same time. Then, the top of the tool is pressed onto the work. This causes the tool to vibrate in the direction toward the work and to rotate at the same time on the surface of the work, thereby boring into the work.

However, in the above conventional method of ultrasonic machining, the rigidity of the tool becomes too low if the diameter thereof is very small, for example no more than 1 mm. At an initial stage of the machining when there is no guide hole yet made, the tip of the tool tends to bend and slide, making an eccentric rotation on the surface of the work without making a bore. Moreover, the above problem may also cause the grindstone to break away from the tool.

In the conventional method, therefore, the smaller the diameter of the tool is, the more difficult boring is and the shorter the life of a tool is.

Wherefore, an object of the present invention made to overcome the above-identified problems is to provide an ultrasonic machine that can rotate the machining head at a high speed.

Another object of the present invention made to overcome the above-identified problems is to provide an ultrasonic machining method in which boring of the work is effectively carried out and the life of the tool is prolonged.

Other objects and benefits of the invention will become apparent from the detailed description which follows hereinafter when taken in conjunction with the drawing figures which accompany it.

SUMMARY

In an ultrasonic machine made to attain the above objects having a main shaft rotatably supported in a housing, a machining head attached to one end of the main shaft, and a piezoelectric transducer for ultrasonically vibrating a tool provided on the machining head, the ultrasonic machine comprises slip rings provided on the periphery of either the machining head or the main shaft as an input terminal, brushes being in slidable touch with the slip rings and connected to a power source, and a brush detach means for detaching the brushes from the slip rings, wherein the brushes and the brush detach means are provided inside the housing of the main shaft.

In the operation of an ultrasonic machine thus constructed, ultrasonic machining is carried out by bringing the brushes provided in the housing into slidable contact with the slip rings provided on the machining head or the periphery of the main shaft, thereby connecting the ultrasonic transducer of the machining head with the power source. The brushes slidably attached to the slip rings are detached if necessary. Because the machining head does not have a housing, a large-diameter bearing is not needed to support the housing. Therefore, the ultrasonic machine of the present invention is free from the main obstacles to high-speed rotation. This way, high-speed rotation is realized.

An ultrasonic machining method developed to attain the above-identified objects comprises the steps of rotating a tool at whose tip a grindstone is fixed around the axis of the tool, and ultrasonically vibrating the tool in the axial direction with the tip being pressed onto a work, wherein the tool is rotated to start a boring operation on the work without ultrasonically vibrating and then after a predetermined depth of a bore is formed, the tool is excited to vibrate ultrasonically.

In operation, the tool with a grindstone fixed to the tip thereof is rotated in the axial direction and pressed onto the work, hence starting a boring operation. After the rotation forms a pre-determined depth of a bore, the tool is ultrasonically vibrated to bore further into the work.

As explained above, the tool is not ultrasonically vibrated until after a pre-determined depth of a bore is formed only by the rotation of the tool. This causes the tool to rotate around the axis thereof without sliding or making an eccentric rotation on the surface of the work. The boring operation, therefore, accurately takes place at one point. Once the tip of the tool bores to a pre-determined depth and rotates in the bore, the tip can be ultrasonically vibrated to carry out boring without bouncing out of the bore because the tip is inserted into the bore deeply enough.

DESCRIPTION OF THE PREFERRED EMBODIMENT

Preferred embodiments of the present invention are explained hereinafter in detail with specific reference to the attached drawings.

First Embodiment

Figure 1:
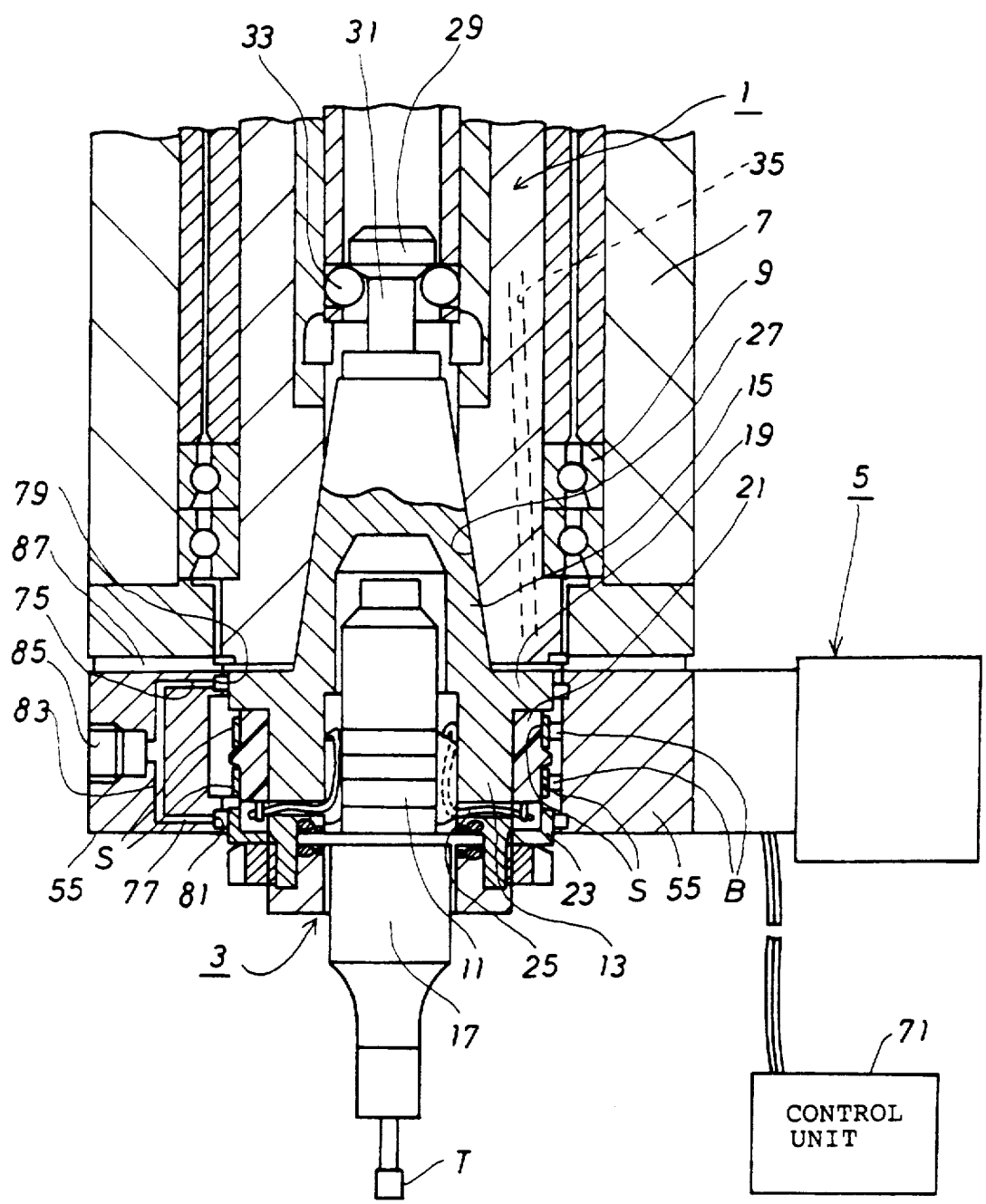
FIG. 1 is a cross-section view mainly showing a machining head of a machine tool of a first embodiment of the present invention.

As shown in FIG. 1, an ultrasonic machine of a first embodiment of this invention comprises a main shaft 1, a machining head 3, and a brush detach means 5. The main shaft 1 is rotatably supported in a housing 7 via a bearing 9. The upper portion of the main shaft 1 is connected with an output shaft of a motor via a drive belt (not shown). The bearing 9 is provided with a various lubrication mechanisms (not shown), enabling high-speed rotation of the main shaft 1.

The machining head 3 is exchangeably mounted on the lower end of the main shaft 1. The machining head 3 has a cylindrical portion 13 that is provided with a piezoelectric transducer 11 and a tapered shaft 15 fixed in the main shaft 1 in the lower end and the upper portions thereof, respectively. Inside the cylindrical portion 13 are the piezoelectric transducer 11 and a horn 17 for amplifying ultrasonic vibration. A tool T is attached to one end of the horn 17.

A flange 19 whose diameter is larger than that of the cylindrical portions is formed on the upper end thereof. Fitted immediately under the flange 19 is an annular resin mold 21, which is fixed by a fixing ring 23. Two slip rings S are fitted on the periphery of the annular resin mold 21. The slip rings S are connected with two faces of the piezoelectric transducer 11 via lead wires 25. The tapered shaft 15 tapers toward the upper end thereof. Because the tapered shaft 15 is fitted closely in a tapered hole, which also has an upward tapering shape, the machining head 3 is automatically set in place. A pull stud 31 with a knob 29 is provided on the upper surface of the tapered shaft 15. Provided under the knob 29 are balls 33, which can be engaged with and detached from the pull stud 31 so that the machining head 3 can be fitted to or released from the main shaft 1. A detailed explanation of the construction of this known mechanism is dispensed with herein.

Figure 2:
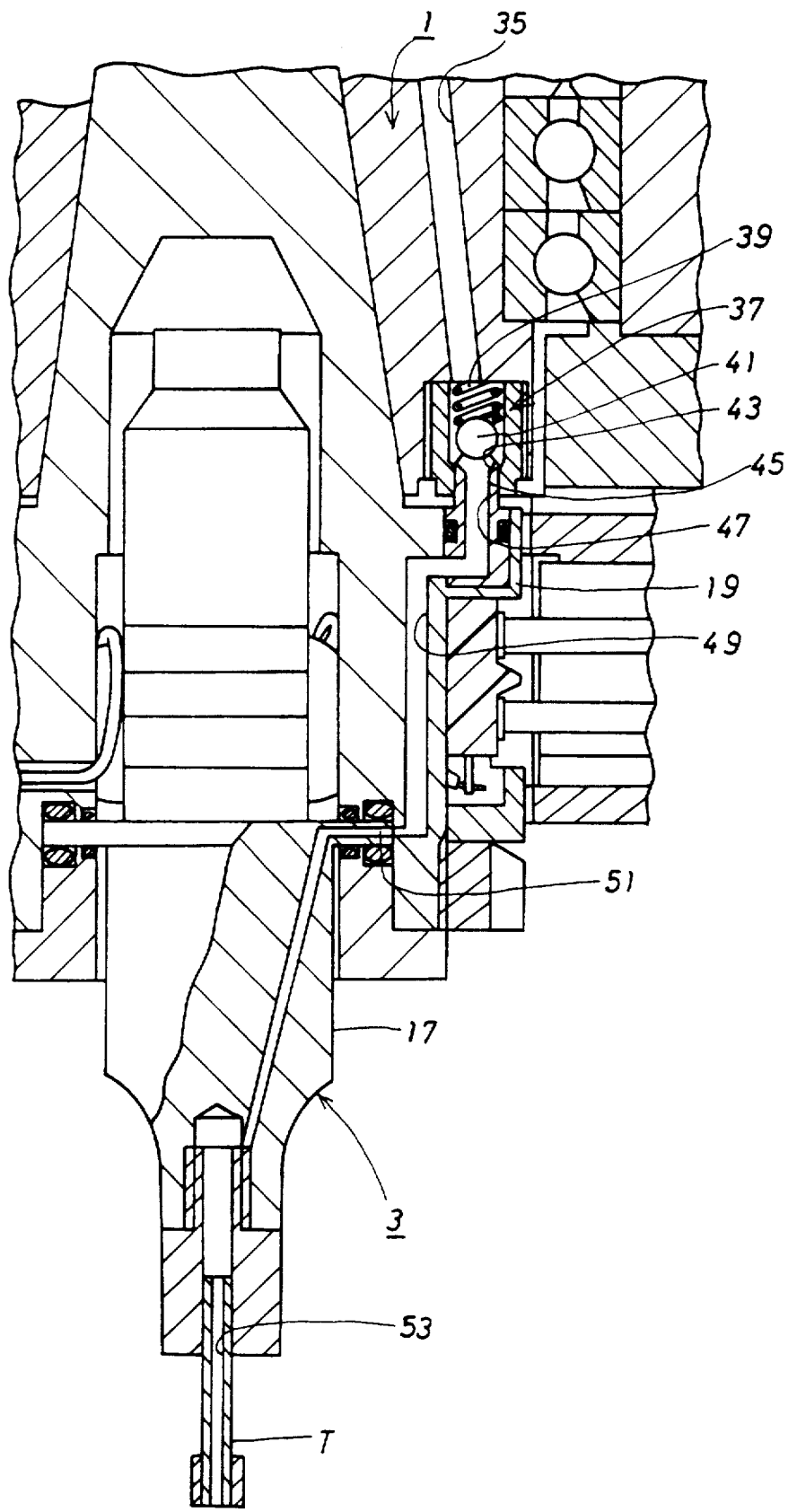
FIG. 2 is an enlarged cross-section view showing a machining liquid supply mechanism of the first embodiment of the present invention.

A machining-liquid feeding mechanism for supplying machining liquid from the main shaft 1 to the machining head 3 is provided between the machining head 3 and the main shaft 1. The machining-liquid feeding mechanism includes a passage 35 for sending a machining liquid downward. As is shown in FIG. 2, the first passage 35 is connected with a valve 37 provided in the bottom part of the main shaft 1. When a ball valve 41 is detached from a valve seat 43 against the force of a spring 39 as shown in FIG. 2, the first passage 35 is opened.

On the other hand, an operation pin 45 for elevating the ball valve 41 is provided above the flange 19 of the machining head 3. A second passage 47 is formed along the axis of the operation pin 45. When the machining head 3 is fitted in the main shaft 1, the operation pin 45 elevates the ball valve 41 to open the valve 37, which allows the first passage 35 to communicate with the second passage 47 of the operation pin 45. The second passage 47 connects with a third passage 49 extending from the flange 19 to the bottom of the cylindrical portion 13. The third passage 49 connects with a fourth passage 51 that has an opening at a periphery of the horn 17 at the bottom of the cylindrical portion 13. The fourth passage 51 extends towards the point where the tool T is fixed and communicates with a machining-liquid feeding passage 53. Therefore, the machining liquid fed through the main shaft 1 from above flows through the first passage 35, the valve 37, the second passage 47 of the operation pin 45, the third passage 49, and the fourth passage 51 and gushes out of the machining-liquid feed passage 53.

Figure 3A:
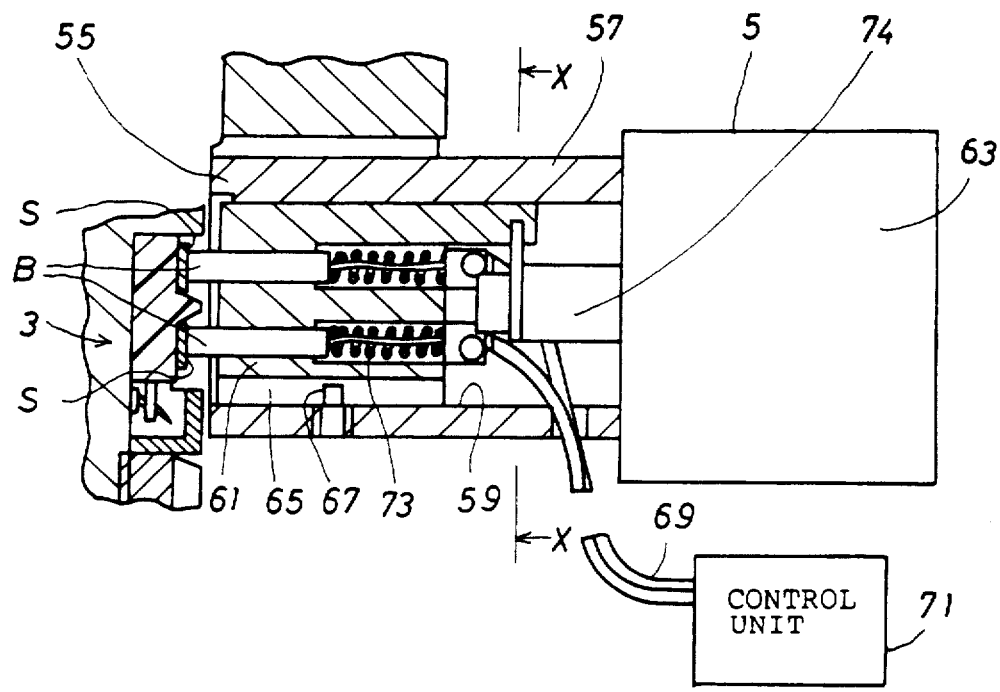
FIG. 3A is a cross-sectional view of a brush detach mechanism of the first embodiment.
Figure 3B:
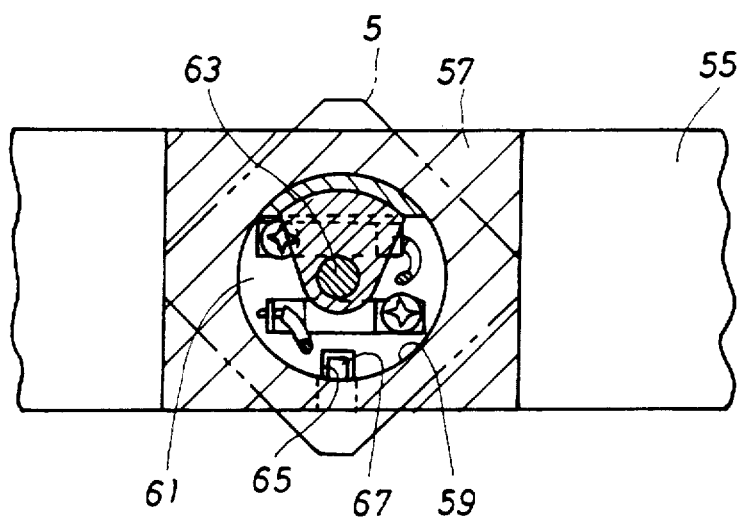
FIG. 3B is a cross-sectional view of the brush detach mechanism of FIG. 3A taken on line X—X.

Referring once again to FIG. 1 with particularity, a brush detach mechanism 5 for bringing brushes B into slidable contact with and for detaching the brushes B from the slip rings S is explained hereinafter. The brush detach mechanism 5 is mounted on an annular holder 55 that is fixed to the bottom of the housing 7. More detailed structure of the brush detach mechanism is shown in an enlarged section view of FIG. 3A and another enlarged section view taken on line X—X of FIG. 3B.

The brush detach mechanism 5 comprises a cylinder 59, a slide block 61, a pair of the brushes B, and an air cylinder 63. The cylinder 59 is circular in cross section and formed as an extension 57 of the holder 55. The slide block 61 is slidably installed in the cylinder 59. In the bottom of the slide block 61, a guide groove 65 is formed in the axial direction of the cylinder 59. A guide pin 67 fixed on the cylinder 59 fits in the guide groove 65. Therefore, the slide block 61 slides without rotating in the cylinder 59.

The pair of the brushes B are supported on one end of the slide block 61 and opposed to the pair of the slip rings S. Each brush B is connected via a cable 69 to a control unit 71 for generating electrical signals for driving the piezoelectric transducer 11. Springs 73 are interposed between the brushes B and the slide block 61 for pushing the brushes B onto the slip rings S. A piston rod 74 of the air cylinder 63 is connected with the slide block 61, thus enabling it to move the slide block 61.

Turning again to FIG. 1, an air seal mechanism provided with the holder 55 to which the machining head 3 is fixed is explained hereinafter. The air seal mechanism comprises nozzles 75 and 77, air guide grooves 79 and 81, an air passage 83, an end connection 85, and an exhaust port 87. The nozzles 75 and 77 are provided in the upper and the lower portions of the holder 55. The nozzles 75 and 77 are located on substantially the same horizontal lines with the flange 19 of the machining head 3 and the fixing ring 23, respectively. The air guide grooves 79 and 81 are connected with the nozzles 75 and 77 and formed all around the holder 55. The air passage 83 sends air from outside to the nozzles 75 and 77. The connection end 85 supplies air from the outside to the passage 83. An air compressor (not shown) is connected to the connection end 85. The exhaust port 87 is grooved on the upper surface of the holder 55. Therefore, the air supplied from the air compressor flows through the nozzles 75 and 77 provided on the upper and the lower portions of the holder 55, reaches all around the holder 55 through the air guide grooves 79 and 81, and flows out of the annular gap between the machining head 3 and the holder 55 and the exhaust port 87, thus forming an air seal.

In the operation of the machine tool of the first embodiment explained above, after the machining head 3 is fixed in the main shaft 1, rotation of the main shaft 1 is started. Then, the brush detach mechanism 5 brings the brushes B into slidable contact with slip rings S. When the control unit 71 sends electrical signals to the ultrasonic transducer 11, the tool T rotates and ultrasonically vibrates at the same time. Thus, ultrasonic machining is carried out.

High rotational speed is achieved because there is no large-diameter bearing that causes a slowdown of the rotation. Therefore, if the diameter of the tool T is small, the tool T is rotated at a high speed so that the periphery thereof rotates sufficiently fast for machining.

Moreover, if the brushes B are detached from the slip rings S to eliminate the friction occurring therebetween, even higher rotational speed can be expected. For example, a shallow guide hole may be initially formed by an extremely highly rotating tool at the point where the work is to be bored before ultrasonic boring is performed. This unique boring method realizes high precision and shorter machining time.

As explained above, because a large-diameter bearing is not used for the machining head 3 and the brushes B are detachable from the slip rings S in the machining tool of the present embodiment, high rotational speed is made possible. This way, an appropriate rotational speed for a specific machining purpose can be selected from a wide rotational speed range, which achieves greater variety of machining methods. The machining method most suitable for the characteristics of a tool and/or a work can be adopted.

Furthermore, the machining liquid is directly supplied to the machining head from the main shaft 1. So, the supply of the machining liquid does not hamper the rotation of the machine head. The air seal, which does not cause friction by acting as an air bearing as well, also contributes to the high rotational speed.

The prior art machine tool of Japan Published Unexamined Utility Model Application No. 64-56941 first feeds machining liquid between the machining head and the housing installed on the periphery of the machining head via the large-diameter bearing, allowing the machining liquid to flow from the outside into the inside of the rotating machining head. This way, fluid resistance slows down the rotation of the machining head. In the present embodiment, such fluid resistance does not occur to hamper the rotational speed.

While the described embodiment represents the preferred form of the invention, it is to be understood that changes and modifications can be made without departing from the scope and the spirit of the invention.

For instance, slip rings may be mounted on the main shaft; that is, the ultrasonic transducer of the machining head is connected to the slip rings when the machining head is fixed in the main shaft.

An engagement groove for attaching an automatic tool changer may be formed on the bottom surface of the machining head so that tools can be automatically changed.

Second Embodiment

An ultrasonic machine of a second embodiment will be explained with specific reference to FIGS. 4–8 hereinafter. Turning first to FIG. 5, an ultrasonic machine 100 comprises a headstock 113, a motor 104, a main shaft 101, an ultrasonic transducer 111, an ultrasonic horn 117, a tool 112 and an ultrasonic generator 114.

The ultrasonic machine 100 is also provided with a work stock (not shown) where a work (not shown) is placed. The work stock is provided with a bed (not shown) that is slidable in the horizontal direction. Provided in the rear of the bed is a column (not shown) by which the headstock 113 is vertically movably supported. A vertical position control unit 113a is provided with the headstock 113 for controlling the vertical position of the headstock 113.

Also provided with the headstock 113 is a cylindrical main shaft 101 rotatably supported by bearings 109a and 109b. The main shaft 101 is also engaged with an output pulley 119 of the motor 104 via a belt 118. The motor 104 is provided with a rotational speed controller 104a for controlling a rotational speed of the motor 104. Two slip rings S' are fitted on the upper portion of the main shaft 101. A pair of lead wires 111a of the piezoelectric transducer 111 are soldered to the slip rings S'. A pair of brushes B' are provided opposite to the slip rings S' The brushes B' are attached to a brush block 105 which is connected to a piston 128 of an air cylinder 163. The air cylinder 163 is fixed on a fixing plate 99. The air cylinder 163 is connected with a pneumatic directional control valve 164 via a passage 164a. The fixing plate 99 is supported by the headstock 113. A guide member 130 is provided along the piston 128 on the fixing plate 99. The guide member 130 movably supports the brush block 105 toward the slip rings S'. The brushes B' can be, thus, brought into contact with and detached from the slip rings S' by controlling the pneumatic directional control valve 164 to change the direction of air supply to the air cylinder 163.

Provided in the generally cylindrical main shaft 101 is an ultrasonic horn 117 combined with the piezoelectric transducer 111 composed of electrostrictive elements. The ultrasonic horn 117 is provided at its end with a tool 112 for polishing. Grindstone 112a is attached to the tip of the tool 112 for grinding operations.

The main shaft 101 is provided with a through bore 181. The diameter of the bore 181 is made greater near the bottom end of the main shaft 101 to form a recess 182. On the other hand, the ultrasonic horn 117 has a support flange 184. While the piezoelectric transducer 111 is fixed on the top of the ultrasonic horn 117, the tool 112 is detachably fixed on the bottom thereof. The lower portion of the ultrasonic horn 117 is tapered in order to amplify ultrasonic vibration. The support flange 184 is formed at the node of the axial-direction ultrasonic vibration caused by the piezoelectric transducer 111 when the tool 112 is attached to the ultrasonic horn 117. The ultrasonic horn 117 having the piezoelectric transducer 111 attached thereto is fitted in place in the main shaft 101. This way, an outer surface 117a of the ultrasonic horn 117 to which the piezoelectric transducer 111 is attached is in slidable contact with the bore 181 and the support flange 184 is slidably engaged with the recess 182. Then, an annular flange fixing plate 185 presses upward and fixes the support flange 184 via two steel rings 186 and 187. The flange fixing plate 185 is fixed to the bottom surface of the main shaft 101 by bolts (not shown).

Figure 4:
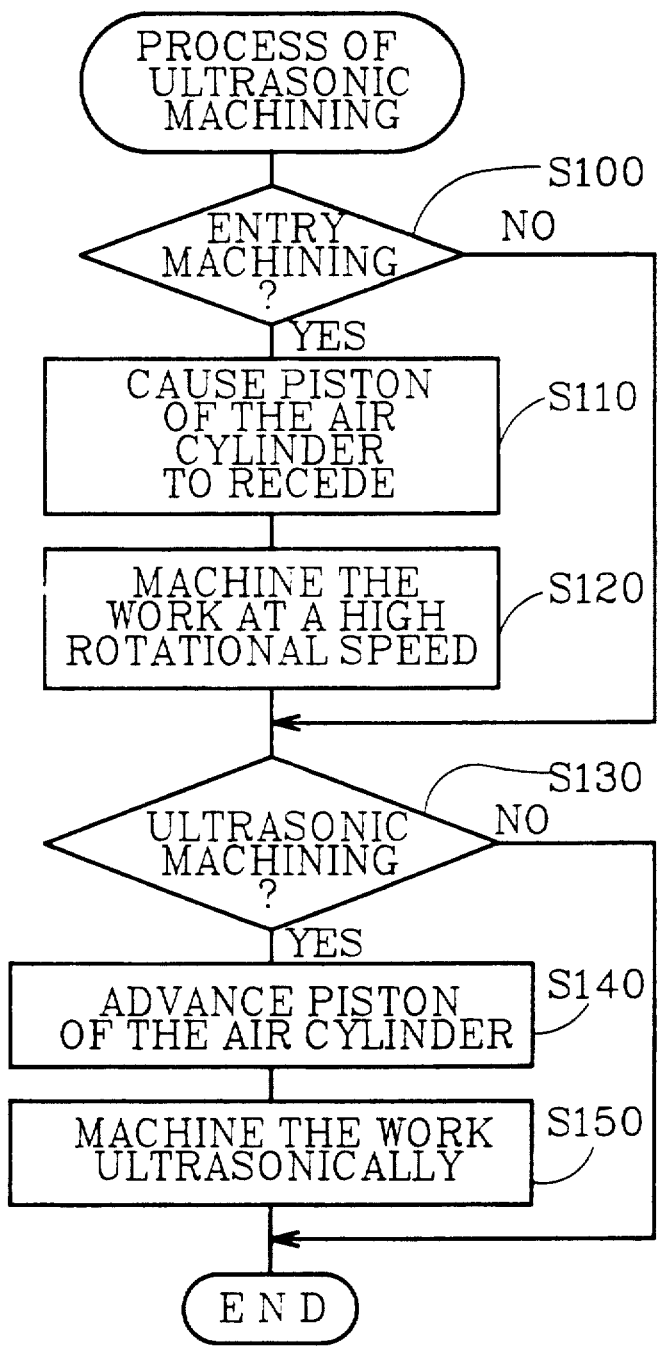
FIG. 4 is a flowchart of an ultrasonic machining method in accordance with a second embodiment of the present invention.
Figure 5:
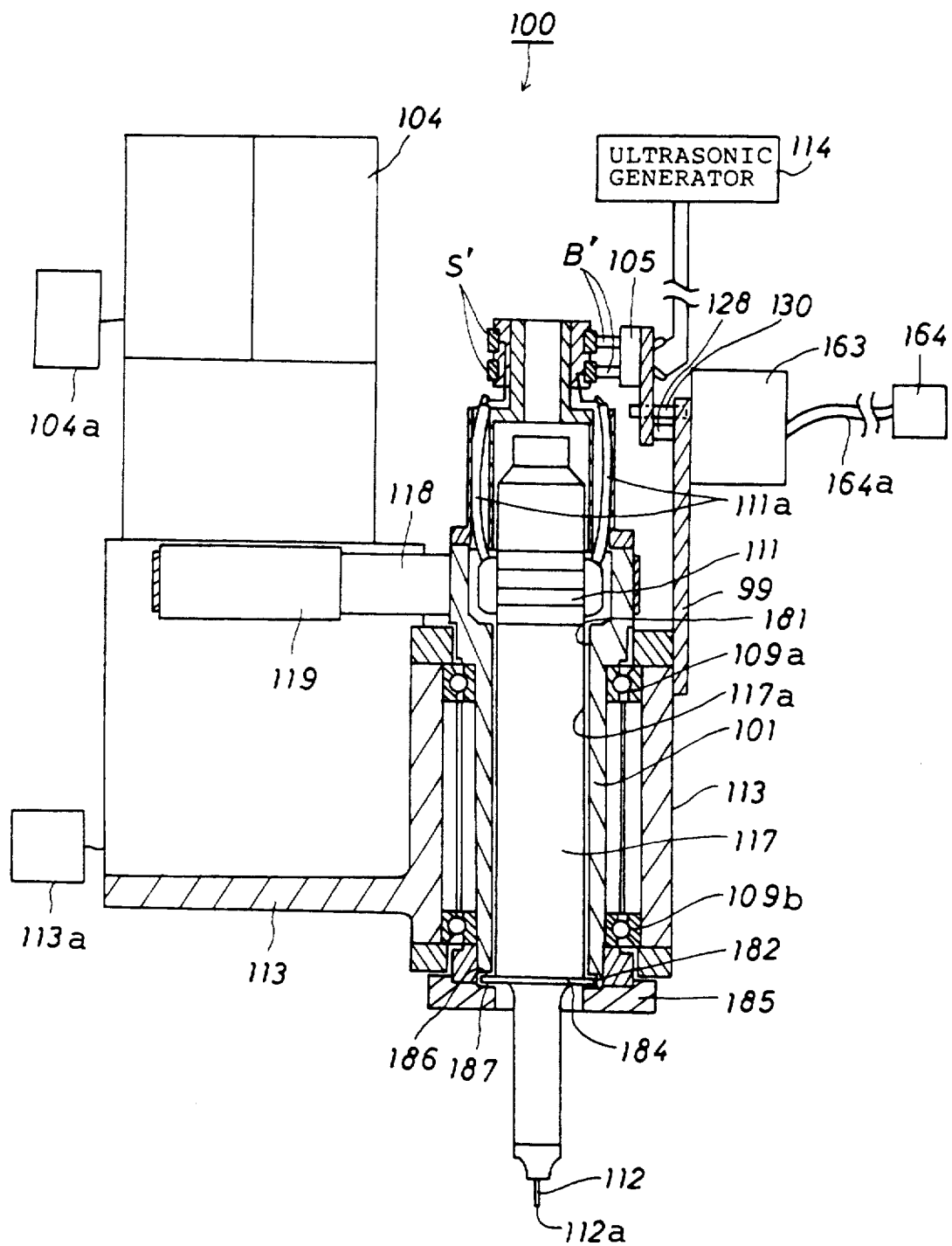
FIG. 5 is a cross-section view of an ultrasonic machine of the second embodiment.

Turning now to FIG. 4, a process of the ultrasonic machining carried out by the operator is explained hereinafter. First, it is determined if entry machining in which a guide hole is made is performed on the work placed on the work stock at step S100. If YES, the pneumatic directional control valve 164 is driven to cause the piston 128 of the air cylinder 163 to recede. This causes the brushes B' to detach from the slip rings S'. Therefore, voltage generated by the ultrasonic generator 114 is not sent to the piezoelectric transducer 111, hence halting ultrasonic vibration. Also, since the brushes B' and the slip rings S' are detached from each other, wear and friction occurring therebetween can be eliminated.

Next, high speed rotational machining is operated on the work at step S120. The rotational speed controller 104a of the motor 104 is controlled to rotate the motor 104 at a high speed. Then, the vertical position control unit 113a is driven to lower the headstock 113. The headstock 113 is lowered until the tip of the tool 112 makes a bore of 0.3-0.4 mm deep in the work.

If the entry machining is not performed from steps S100-S120, the process goes to step S130 from step S100. If the entry machining is performed, the process also goes to step S130 from step S120. At step S130, it is determined if ultrasonic machining is carried out. If NO, the process terminates. If YES, the pneumatic directional control valve 164 is controlled to advance the piston 128 of the air cylinder 163 at step S140. This brings the brushes B' into contact with the slip rings S' so that output voltage is supplied to the piezoelectric transducer 111 from the ultrasonic generator 114. Subsequently, the piezoelectric transducer 111 starts to vibrate the tool 112 ultrasonically.

Now, ultrasonic machining is performed on the work at step S150. After the rotational speed controller 104a is operated to rotate the motor 104 at a slow speed, the vertical position control unit 113a is operated to lower the headstock 103. The headstock 103 is allowed to lower until the tip of the tool 112 bores down to a predetermined depth. After the ultrasonic machining is completed at step S150, the headstock 103 is elevated and the rotation of the motor 104 is terminated. A predetermined depth of a bore is thus formed.

Figure 6:
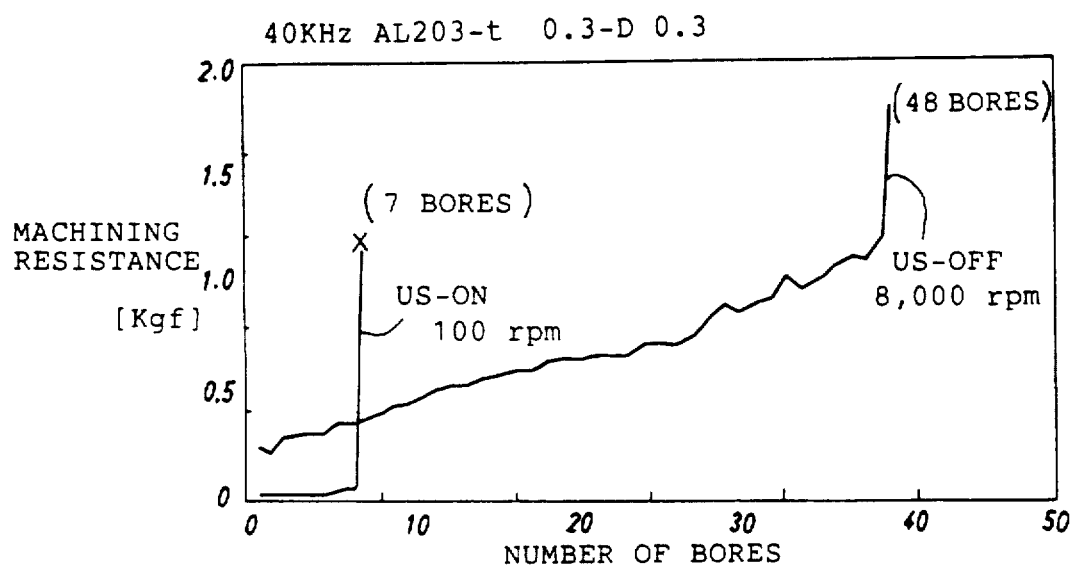
FIGS. 6–8 are graphs showing results of experiments conducted to prove the advantages of the second embodiment.

The followings are experimental data for the ultrasonic machining of the present embodiment. The graph of FIG. 6 shows experimental data that compares two different machining methods in number of 0.3 mm-deep bores formed before the tools were too worn out to bore any further. In the first of the two methods, a tool 112 having a diameter D of 0.3 mm was rotated at 100 rpm and ultrasonically vibrated at 40 KHz at the same time on alumina with no guide hole. In the second method, the rotational speed was set at 8,000 rpm and no ultrasonic vibration was applied although the other conditions were the same as those of the first method. In the graphs of the attached drawings, US-ON indicates that ultrasonic vibration was applied to the tool 112 while US-OFF indicates that ultrasonic vibration was not applied. The results show that a far greater number of bores were formed in the second method in which no ultrasonic vibration was used than in the first method.

Figure 7:
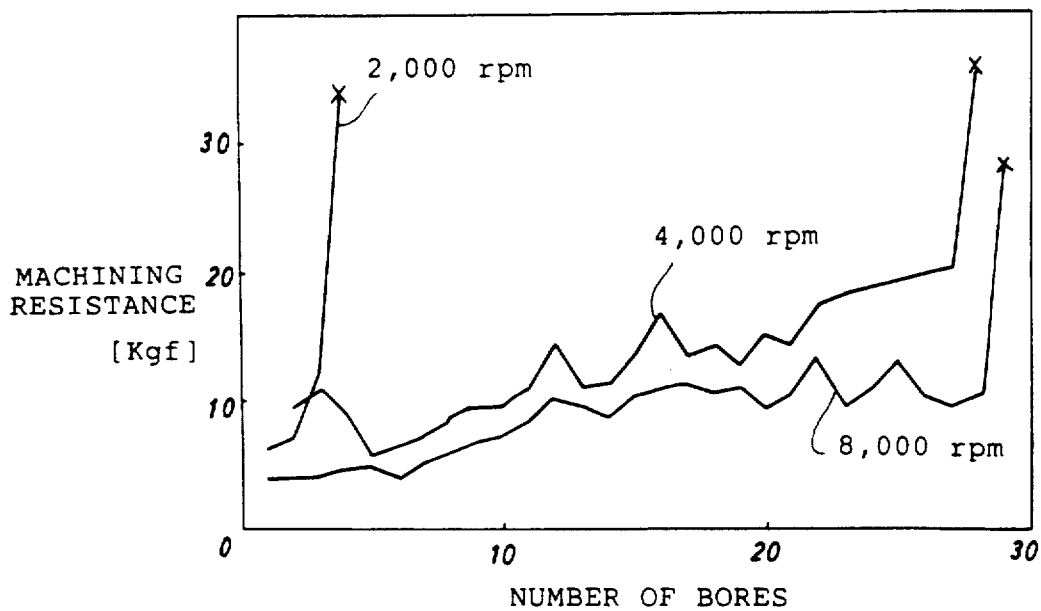

The graph of FIG. 7 shows the results of an experiment in which identical tools formed 0.4 mm-deep bores in silicon carbide having no guide hole without applying ultrasonic vibration thereto at three different rotational speeds until the tools were too worn out to perform any more boring. The three rotational speeds were 2,000 rpm, 4,000 rpm, and 8,000 rpm. The tools were 1 mm in diameter having a No. 200 grindstone. The tools were moved in the axial direction thereof at 0.5 mm/minute. The experimental data shows that if no ultrasonic vibration was applied, the higher the rotational speed of the tools were, the smaller the machining resistance (Kfg) was and the more bores were formed. Therefore, the higher the rotational speed is, the more the durability of the tool 112 increases.

Figure 8:
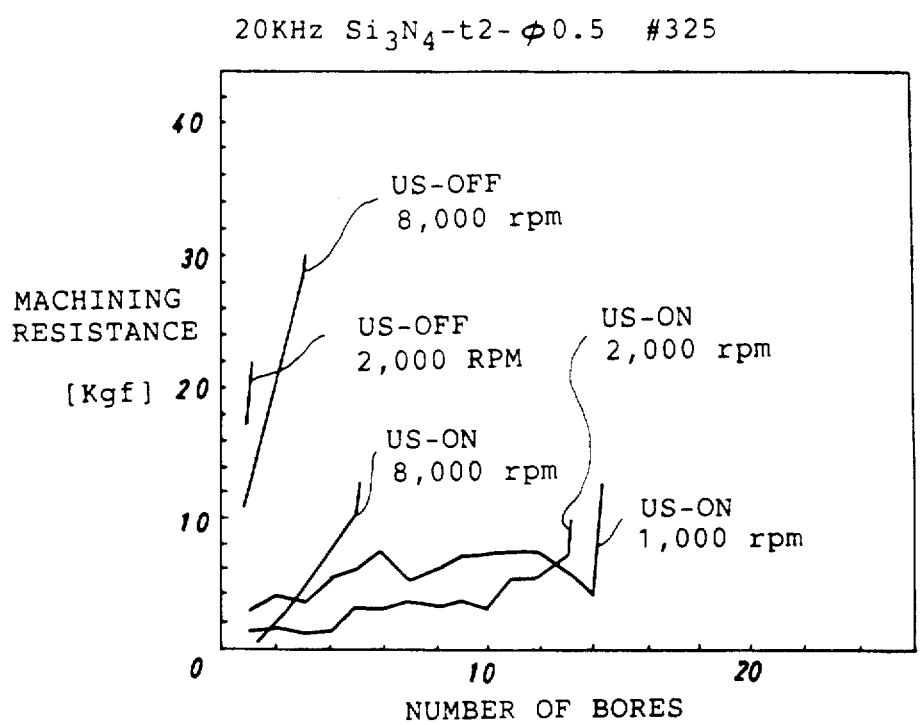

The graph of FIG. 8 shows the results of an experiment in which identical tools formed 2 mm-deep bores in silicon carbide ($Si_3N_4$) with applying ultrasonic vibration of 20 KHz. The tools were rotated at three different rotational speeds (1,000 rpm, 2,000 rpm, and 8,000 rpm) and moved at two different traveling speeds (2 mm/minute and 1 mm/minute) in the axial direction of the tools until the tools were too worn out to perform any more boring. When the tool was rotated at 1,000 rpm, the traveling speed was set at 2 mm/minute. On the other hand, if the tool was rotated at 2,000 rpm or at 8,000 rpm, the traveling speed was set at 1 mm/minute. The tools were 0.5 mm in diameter having No. 325 grindstone. The present experiment was conducted after guiding holes were formed on the silicon carbide. The present graph also includes experimental data for machining methods which did not use ultrasonic vibration. The rotational speeds were 2,000 rpm and 8,000 rpm while the traveling speeds were 1 mm/minute for both rotational speeds with the other conditions being the same as those of the above. The results show that if guiding holes were made beforehand, the methods that used ultrasonic vibration produced more bores than the ones that did not use ultrasonic vibration. The experimental data further shows that if ultrasonic vibration was applied to the tools, the slower the rotational speed was, the more the durability of the tools increased.

As shown in the above experimental data, ultrasonic vibration should not be applied to the tool 112 in the initial guide hole making and it is after the guide hole is made only by rotating the tool at the fastest possible speed that ultrasonic vibration should be applied to the tool 112. Also, while ultrasonically vibrated, the tool 112 should be rotated slower than in the guide hole making. This way, the durability of the tool 112 increases.

In accordance with the ultrasonic machining of the present embodiment, the tool 112 is rotated at a high speed while the slip rings S' that supplies electricity to the piezoelectric transducer 111 are separated from the brushes B'. The tool 112 rotates without being ultrasonically vibrated and does not bend and slide on the surface of the work, hence not making eccentric rotation. Consequently, boring is accurately carried out at a predetermined point of the work.

Furthermore, the tip of the tool 112 provided with the grindstone 112a works on the work surface at the right angle thereto, realizing the optimum operational condition for the tool 112.

Since the slip rings S' are detached from the brushes B' to eliminate the friction occurring therebetween, the durability thereof increases. The detachability also contributes to the reduction of the rotational resistance. The rotational speed of the tool 112 thus can be maximized. Having the above construction, the rotational speed of the periphery of the very thin tool 112, for example with a diameter of 0.5 mm, approaches 1,000 m/minute, which is considered to be an appropriate speed for the tool 112 provided with the grindstone 112a. Therefore, the present embodiment offered the advantage that the durability of the thin tool 112 and boring efficiency will increase.

Moreover, after a guide hole is made, the rotation and the ultrasonic vibration of the tool 112 work well in cooperation so that highly efficient ultrasonic boring is made possible and the durability of the tool 112 increases.

Although the described embodiment represents the preferred form of the invention, it is to be understood that changes and modifications can be made without departing from the spirit and the scope of the invention.

For example, the air cylinder 163 may be replaced with an actuator such as a motor or a solenoid as a means to move the brushes B'. Although the rotational force of the main shaft 101 is transmitted by the belt 118 in the present embodiment, the motor 104 may be installed above the main shaft 101 so that the motor 104 and the main shaft 101 can be connected by coupling, which is generally known as a motor built-in method. This will further increase the rotational speed of the tool 112.

The manually executed steps of the ultrasonic machining as shown in the flowchart of FIG. 4 may be automatically controlled by a control unit such as a microcomputer.

In accordance with the machine tool of the present invention, because a large-diameter bearing is not used and the brushes are detachable from the slip rings, high rotational speed is made possible. Thus, the present invention offers the advantage that an appropriate rotational speed for a specific purpose can be selected from a wide rotational speed range, which achieves greater variety of machining methods.

In the method of ultrasonic machining of the present invention, the tip of the tool does not slip and make eccentric rotation because ultrasonic vibration is not applied to the tool in the initial machining stage. The work is accurately bored at a pre-determined point.

At the initial stage of the boring operation, the tool does not bend, slip, and rotate eccentrically on the surface of the work to accelerate wear of the grindstone without boring into the work efficiently. Therefore, both machining efficiency and durability of the tool increases. Moreover, once a pre-determined depth of a bore is formed, ultrasonic vibration and rotation applied to the tool cooperate to realize highly efficient machining. Both durability of the tool and machinability are enhanced in accordance with the present invention.

Wherefore, having thus described the present invention, what is claimed is:

1. In an ultrasonic machine having a main shaft rotatably supported in a housing, a machining head attached to one end of the main shaft, and a piezoelectric transducer electrically connected to a source of power for ultrasonically vibrating a tool provided on the machining head, the improvement comprising:
a) slip ring means comprising a cylindrical slip ring carried concentrically about said machining head and a brush positioned adjacent said slip ring and sliding on said slip ring to provide moving electrical contact therebetween disposed in an electrical connection to the piezoelectric transducer from the source of power;
b) brush detach means connected for selectably removing any contact between said brush and said ring;
c) a moving brush holder carrying said brush for radial movement between a first position with said brush in sliding contact with said slip ring and a second position with said brush withdrawn from sliding contact with said slip ring; and,
d) actuator means for moving said brush holder between said first position and said second position.

2. The improvement to an ultrasonic machine of claim 1 and additionally comprising:
guide means for accurately and repeatedly guiding said brush holder between said first position and said second position.

3. A boring machine for accurately boring holes in surfaces of workpieces comprising:
a) a housing carried for movement towards and away from a surface of a workpiece to be bored;
b) a main shaft rotatably supported in a housing;
c) a cylindrical machining head concentrically carried by one end of said main shaft for rotation in combination therewith;
d) a tool concentrically carried by a working end of said machining head for rotation in combination therewith;
e) piezoelectric transducer means on said machining head for ultrasonically vibrating said tool longitudinally;
f) removable contact means for selectively making and breaking a sliding mechanical electrical connection supplying power to said piezoelectric transducer means whereby said tool can be selectively rotated at high speeds without longitudinal vibration thereof and without excess frictional drag on said machining head;
g) slip ring means comprising a cylindrical slip ring carried concentrically about said machining head and a brush positioned adjacent said slip ring and sliding on said slip ring to provide moving electrical contact therebetween disposed in an electrical connection to the piezoelectric transducer from a source of power;
h) brush detach means connected for selectably removing any contact between said brush and said ring;
i) a moving brush holder carrying said brush for radial movement between a first position with said brush in sliding contact with said slip ring and a second position with said brush withdrawn form sliding contact with said slip ring; and
j) actuator means for moving said brush holder between said first position and said second position.

4. The boring machine of claim 3 and additionally comprising:
guide means for accurately and repeatedly guiding said brush holder between said first position and said second position.

5. The boring machine of claim 3 and additionally comprising:
air bearing means surrounding said machining head for reducing friction on said machining head whereby said machining head can be rotated at higher speeds.

6. An ultrasonic machining method comprising the steps of:
   a) rotating a tool at whose tip a grindstone is fixed around a longitudinal axis of the tool;
   b) pressing the tip of the tool while rotating onto a surface of a workpiece to be machined to start a boring operation on the workpiece without ultrasonically vibrating the tool; and,
   c) after a pre-determined depth of a bore is formed, ultrasonically vibrating the tool along the longitudinal axial with the tip rotating and being pressed onto surface of the workpiece until a bore of desired depth is created.

7. An ultrasonic machining method for accurately machining small bores into hard materials such as ceramics comprising the steps of:
   a) rotating a boring tool at whose tip a grindstone is fixed around a longitudinal axis of the tool at a high rotational speed without ultrasonically vibrating the tool;
   b) pressing the tip of the tool while rotating onto a surface of a workpiece to be machined to accurately start a boring operation on the workpiece without lateral movement of the tool; and,
   c) after a pre-determined depth of a bore is formed, ultrasonically vibrating the tool along the longitudinal axial with the tip rotating at a reduced rotational speed and being pressed onto surface of the workpiece until a bore of desired depth is created.

8. In an ultrasonic machine having a main shaft rotatably supported in a housing, a machining head attached to one end of the main shaft, and a piezoelectric transducer electrically connected to a source of power for ultrasonically vibrating a tool provided on the machining head, a method of construction and operation comprising the steps of:
   a) providing slip ring means comprising a brush sliding on a ring to provide moving electrical contact therebetween disposed in an electrical connection to the piezoelectric transducer from a source of power;
   b) providing brush detach means connected for selectably removing any contact between the brush and the ring;
   c) employing the brush detach means to remove electrical contact between the brush and the ring;
   d) rotating the main shaft to rotate a tool on the machining head at whose tip a grindstone is fixed around a longitudinal axis of the tool;
   e) pressing the tip of the tool while rotating onto a surface of a workpiece to be machined to start a boring operation on the workpiece without ultrasonically vibrating the tool; and,
   f) after a pre-determined depth of a bore is formed, employing the brush detach means to establish electrical contact between the brush and the ring whereby to ultrasonically vibrate the tool along the longitudinal axial with the tip rotating and being pressed onto surface of the workpiece until a bore of desired depth is created.

9. In an ultrasonic machine having a main shaft rotatably supported in a housing, a machining head attached to one end of the main shaft, and a piezoelectric transducer electrically connected to a source of power for ultrasonically vibrating a tool provided on the machining head, a method of construction and operation for accurately machining small bores into hard materials such as ceramics comprising the steps of:
   a) providing slip ring means comprising a brush sliding on a ring to provide moving electrical contact therebetween disposed in an electrical connection to the piezoelectric transducer from a source of power;
   b) providing brush detach means connected for selectably removing any contact between the brush and the ring;
   c) employing the brush detach means to remove electrical contact between the brush and the ring;
   d) rotating the main shaft at a high speed to rotate a tool on the machining head at whose tip a grindstone is fixed around a longitudinal axis of the tool;
   e) pressing the tip of the tool while rotating onto a surface of a workpiece to be machined to start a boring operation on the workpiece without ultrasonically vibrating the tool; and,
   f) after a pre-determined depth of a bore is formed, reducing speed of rotation of the main shaft and employing the brush detach means to establish electrical contact between the brush and the ring whereby to ultrasonically vibrate the tool along the longitudinal axial with the tip rotating and being pressed onto surface of the workpiece until a bore of desired depth is created.

10. In an ultrasonic machine having a main shaft rotatably supported in a housing, a machining head attached to one end of the main shaft, and a piezoelectric transducer electrically connected to a source of power for ultrasonically vibrating a tool provided on the machining head, the improvement comprising:
    a) a cylindrical slip ring carried concentrically about said machining head, said slip ring being electrically connected to the piezoelectric transducer for supplying power thereto;
    b) a brush positioned adjacent said slip ring, said brush being electrically connected to a source of power for the piezoelectric transducer;
    c) brush detach means connected for selectably removing any contact between said brush and said ring;
    d) moving brush holder means for carrying said brush between a first position with said brush in sliding contact with said slip ring and a second position with said brush withdrawn from sliding contact with said slip ring; and,
    e) actuator means for moving said brush holder means between said first position and said second position.

11. The improvement to an ultrasonic machine of claim 10 and additionally comprising:
    guide means for accurately and repeatedly guiding said brush holder means between said first position and said second position.

12. The improvement to an ultrasonic machine of claim 11 wherein:
    said guide means guides said brush holder means radially in and out towards and away from said machining head between said first position and said second position.

13. The improvement to an ultrasonic machine of claim 11 wherein:
    said actuator means comprises a pneumatic actuator connected to said brush holder means.

* * * * *